(12) United States Patent
Faria Ribeiro et al.

(10) Patent No.: US 12,539,208 B2
(45) Date of Patent: Feb. 3, 2026

(54) DIFFRACTIVE LENSES WITH DIFFRACTIVE ORDER SHIFT

(71) Applicant: AMO Groningen B.V., Groningen (NL)

(72) Inventors: Miguel Faria Ribeiro, Braga (PT); Mark Jenkins Sanchez, Groningen (NL)

(73) Assignee: AMO Groningen B.V., Groningen (NL)

( * ) Notice: Subject to any disclaimer, the term of this patent is extended or adjusted under 35 U.S.C. 154(b) by 418 days.

(21) Appl. No.: 18/163,050

(22) Filed: Feb. 1, 2023

(65) Prior Publication Data
US 2023/0255750 A1 Aug. 17, 2023

Related U.S. Application Data

(60) Provisional application No. 63/267,415, filed on Feb. 1, 2022.

(51) Int. Cl.
*A61F 2/16* (2006.01)
*G02C 7/02* (2006.01)
*G02C 7/06* (2006.01)

(52) U.S. Cl.
CPC ............ *A61F 2/1654* (2013.01); *G02C 7/028* (2013.01); *G02C 7/06* (2013.01)

(58) Field of Classification Search
CPC ....... A61F 2/1654; G02C 7/028; G02C 7/042; G02C 7/06; G02C 2202/20; G02C 2202/22
See application file for complete search history.

(56) References Cited

U.S. PATENT DOCUMENTS

| | | | |
|---|---|---|---|
| 4,210,391 A * | 7/1980 | Cohen | G02B 5/1876 359/743 |
| 4,655,565 A | 4/1987 | Freeman | |
| 5,071,207 A | 12/1991 | Ceglio et al. | |
| 5,117,306 A | 5/1992 | Cohen | |
| 5,152,787 A | 10/1992 | Hamblen | |
| 5,178,636 A | 1/1993 | Silberman | |
| 5,201,762 A | 4/1993 | Hauber | |
| 5,589,982 A | 12/1996 | Faklis et al. | |
| 5,895,422 A | 4/1999 | Hauber | |
| 6,266,191 B1 | 7/2001 | Abe | |
| 6,366,405 B2 | 4/2002 | Abe | |
| 6,536,899 B1 | 3/2003 | Fiala | |

(Continued)

FOREIGN PATENT DOCUMENTS

| | | |
|---|---|---|
| CN | 101039635 A | 9/2007 |
| CN | 104127263 B | 3/2016 |

(Continued)

OTHER PUBLICATIONS

Castignoles F., et al., "Comparison of the Efficiency, MTF and Chromatic Properties of Four Diffractive Bifocal Intraocular Lens Designs," Optics Express, Mar. 2010, vol. 18 (5), pp. 5245-5256.

(Continued)

*Primary Examiner* — Nelson M Rosario

(57) ABSTRACT

Apparatuses, systems and methods for providing improved ophthalmic lenses, particularly intraocular lenses (IOLs). Embodiments may include a shift of a diffractive order.

11 Claims, 10 Drawing Sheets

(56) References Cited

U.S. PATENT DOCUMENTS

| | | |
|---|---|---|
| 6,590,708 B2 | 7/2003 | Nakai et al. |
| 6,830,332 B2 | 12/2004 | Piers et al. |
| 6,917,472 B1 | 7/2005 | Yun et al. |
| 6,951,391 B2 | 10/2005 | Morris et al. |
| 7,093,938 B2 | 8/2006 | Morris et al. |
| 7,188,949 B2 | 3/2007 | Bandhauer et al. |
| 7,572,007 B2 | 8/2009 | Simpson |
| 7,677,725 B2 | 3/2010 | Piers et al. |
| 7,717,558 B2 | 5/2010 | Hong et al. |
| 8,231,219 B2 | 7/2012 | Weeber |
| 8,292,952 B2 * | 10/2012 | Bille ............... A61F 9/00812 623/6.22 |
| 8,529,623 B2 | 9/2013 | Piers et al. |
| 8,556,417 B2 | 10/2013 | Das et al. |
| 8,623,083 B2 | 1/2014 | Piers et al. |
| 8,709,079 B2 | 4/2014 | Zhang et al. |
| 8,734,511 B2 | 5/2014 | Weeber et al. |
| 8,771,348 B2 | 7/2014 | Zhao |
| 8,992,611 B2 | 3/2015 | Zhao et al. |
| 9,069,185 B2 | 6/2015 | Zhao |
| 9,078,745 B2 | 7/2015 | Zhang et al. |
| 9,089,421 B2 | 7/2015 | Carson et al. |
| 9,122,074 B2 | 9/2015 | Piers et al. |
| 9,223,148 B2 | 12/2015 | Fiala et al. |
| 9,304,329 B2 | 4/2016 | Zhao |
| 9,320,594 B2 | 4/2016 | Schwiegerling |
| 9,335,563 B2 | 5/2016 | Weeber |
| 9,335,564 B2 | 5/2016 | Choi et al. |
| 9,474,595 B2 | 10/2016 | Zhao et al. |
| 9,901,441 B2 | 2/2018 | Barrett et al. |
| 10,175,505 B2 | 1/2019 | Muschielok et al. |
| 10,197,815 B2 | 2/2019 | Weeber et al. |
| 10,226,326 B2 | 3/2019 | Zhao |
| 10,278,811 B2 | 5/2019 | Choi et al. |
| 10,420,638 B2 | 9/2019 | Hong et al. |
| 10,426,599 B2 | 10/2019 | Choi et al. |
| 10,531,950 B2 | 1/2020 | Tiwari et al. |
| 10,588,738 B2 | 3/2020 | Rosen et al. |
| 10,698,234 B2 | 6/2020 | Zhao |
| 10,831,040 B2 | 11/2020 | Dobschal et al. |
| 10,842,617 B2 | 11/2020 | Hong et al. |
| 10,945,834 B2 | 3/2021 | Bor et al. |
| 10,993,798 B2 | 5/2021 | Choi et al. |
| 11,000,361 B2 | 5/2021 | Hong et al. |
| 11,022,815 B2 | 6/2021 | Weeber |
| 2006/0238702 A1 | 10/2006 | Glick et al. |
| 2007/0282438 A1 | 12/2007 | Hong et al. |
| 2008/0147185 A1 | 6/2008 | Hong et al. |
| 2009/0088840 A1 | 4/2009 | Simpson et al. |
| 2009/0210054 A1 | 8/2009 | Weeber et al. |
| 2010/0131060 A1 | 5/2010 | Simpson et al. |
| 2010/0312336 A1 | 12/2010 | Hong et al. |
| 2011/0149236 A1 | 6/2011 | Weeber |
| 2012/0140166 A1 | 6/2012 | Zhao |
| 2014/0005781 A1 | 1/2014 | Zhao et al. |
| 2014/0303725 A1 | 10/2014 | Barrett et al. |
| 2016/0262876 A1 | 9/2016 | DeBoer et al. |
| 2016/0320633 A1 | 11/2016 | Weeber et al. |
| 2017/0239038 A1 | 8/2017 | Choi et al. |
| 2017/0252151 A1 | 9/2017 | Mackool |
| 2018/0092739 A1 | 4/2018 | Pagnoulle et al. |
| 2018/0147052 A1 | 5/2018 | Hong et al. |
| 2018/0311034 A1 | 11/2018 | Hong et al. |
| 2018/0333255 A1 | 11/2018 | Weeber et al. |
| 2018/0373060 A1 | 12/2018 | Knox et al. |
| 2019/0004331 A1 * | 1/2019 | Weeber ............... A61F 2/1618 |
| 2019/0004335 A1 | 1/2019 | Weeber et al. |
| 2019/0224000 A1 | 7/2019 | Choi et al. |
| 2019/0254810 A1 | 8/2019 | Tiwari et al. |
| 2019/0307557 A1 | 10/2019 | De Carvalho et al. |
| 2019/0314148 A1 | 10/2019 | Liu |
| 2019/0365528 A1 | 12/2019 | Choi et al. |
| 2020/0038172 A1 | 2/2020 | Hussain et al. |
| 2020/0085569 A1 | 3/2020 | Kaschke et al. |
| 2021/0030532 A1 | 2/2021 | Hong et al. |
| 2021/0196450 A1 | 7/2021 | Rosen et al. |
| 2021/0196451 A1 | 7/2021 | Rosen et al. |
| 2021/0196452 A1 | 7/2021 | Gounou et al. |
| 2021/0196453 A1 | 7/2021 | Rosen et al. |
| 2021/0220118 A1 | 7/2021 | Choi et al. |
| 2023/0190452 A1 | 6/2023 | Rosen et al. |
| 2024/0189095 A1 | 6/2024 | Rosen et al. |

FOREIGN PATENT DOCUMENTS

| | | |
|---|---|---|
| CN | 214761623 U | 11/2021 |
| EP | 0470811 B1 | 9/1997 |
| EP | 2045648 B1 | 4/2012 |
| JP | 2016150213 A | 8/2016 |
| JP | 6504332 B1 | 4/2019 |
| WO | 0241806 A1 | 5/2002 |
| WO | 2006067255 A1 | 6/2006 |
| WO | 2012028755 A1 | 3/2012 |
| WO | 2014033543 A2 | 3/2014 |
| WO | 2019130030 A1 | 7/2019 |
| WO | 2020132703 A1 | 6/2020 |

OTHER PUBLICATIONS

Cohen A.L., "Practical Design of a Bifocal Hologram Contact Lens or Intraocular Lens," Applied Optics, Jul. 1, 1992, vol. 31 (19), pp. 3750-3754.

Faklis D., et al., "Spectral Properties of Multiorder Diffractive Lenses", Applied Optics, May 1995, vol. 34 (14), pp. 2462-2468.

Morlock, R., et al., "Patient-Reported Spectacle Independence Questionnaire (PRSIQ): Development and Validation," American Journal of Ophthalmology, Jun. 2017, vol. 178, pp. 101-114.

Sokołowski M., et al. "Hybrid Heptafocal Intraocular Lenses," Optica Applicata, Dec. 2015, vol. 45 (3), pp. 285-298.

* cited by examiner

DIFFRACTIVE LENSES WITH DIFFRACTIVE ORDER SHIFT

CROSS REFERENCE TO RELATED APPLICATIONS

This application claims the benefit under 35 U.S.C. § 119(e) of U.S. Provisional Application No. 63/267,415, filed Feb. 1, 2022, the contents of which are incorporated by reference as if fully set forth.

BACKGROUND

Embodiments of the present disclosure relate to vision treatment techniques and in particular, to ophthalmic lenses such as, for example, contact lenses, corneal inlays or onlays, or intraocular lenses (IOLs) including, for example, phakic IOLs and piggyback IOLs (i.e. IOLs implanted in an eye already having an IOL).

Presbyopia is a condition that affects the accommodation properties of the eye. As objects move closer to a young, properly functioning eye, the effects of ciliary muscle contraction and zonular relaxation allow the lens of the eye to change shape, and thus increase its optical power and ability to focus at near distances. This accommodation can allow the eye to focus and refocus between near and far objects.

Presbyopia normally develops as a person ages and is associated with a natural progressive loss of accommodation. The presbyopic eye often loses the ability to rapidly and easily refocus on objects at varying distances. The effects of presbyopia usually become noticeable after the age of 45 years. By the age of 65 years, the crystalline lens has often lost almost all elastic properties and has only a limited ability to change shape.

Along with reductions in accommodation of the eye, age may also induce clouding of the lens due to the formation of a cataract. A cataract may form in the hard central nucleus of the lens, in the softer peripheral cortical portion of the lens, or at the back of the lens. Cataracts can be treated by the replacement of the cloudy natural lens with an artificial lens. An artificial lens replaces the natural lens in the eye, with the artificial lens often being referred to as an intraocular lens or "IOL."

Monofocal IOLs are intended to provide vision correction at one distance only, usually the far focus. At the very least, since a monofocal IOL provides vision treatment at only one distance and since the typical correction is for far distance, spectacles are usually needed for good vision at near distances and sometimes for good vision at intermediate distances. The term "near vision" generally corresponds to vision provided when objects are at a distance from the subject eye at equal; or less than 1.5 feet. The term "distance vision" generally corresponds to vision provided when objects are at a distance of at least about 5-6 feet or greater. The term "intermediate vision" corresponds to vision provided when objects are at a distance of about 1.5 feet to about 5-6 feet from the subject eye. Such characterizations of near, intermediate, and distance vision correspond to those addressed in Morlock R, Wirth R J, Tally S R, Garufis C, Heichel C W D, Patient-Reported Spectacle Independence Questionnaire (PRSIQ): Development and Validation. Am J Ophthalmology 2017; 178:101-114.

There have been various attempts to address limitations associated with monofocal IOLs. For example, multifocal IOLs have been proposed that deliver, in principle, two foci, one near and one far, optionally with some degree of intermediate focus. Such multifocal, or bifocal, IOLs are intended to provide good vision at two distances, and include both refractive and diffractive multifocal IOLs. In some instances, a multifocal IOL intended to correct vision at two distances may provide a near (add) power of about 3.0 or 4.0 diopters.

Multifocal IOLs may, for example, rely on a diffractive optical surface to direct portions of the light energy toward differing focal distances, thereby allowing the patient to clearly see both near and far objects. Multifocal ophthalmic lenses (including contact lenses or the like) have also been proposed for treatment of presbyopia without removal of the natural crystalline lens. Diffractive optical surfaces, either monofocal or multifocal, may also be configured to provide reduced chromatic aberration.

Current state of the art diffractive monofocal, extended depth of focus (EDOF), and multifocal lenses can make use of a material having a given refractive index and a surface curvature which provide a refractive power. Diffractive lenses have a diffractive profile which confers the lens with diffractive powers that may contribute to the overall optical power of the lens. The diffractive profile is typically characterized by a number of diffractive zones. When used for ophthalmic lenses these zones are typically annular lens zones, or optical zones, or echelettes, spaced about the optical axis of the lens. Each optical zone or echelette may be defined by an optical portion, a transition zone, and an optical zone or echelette geometry. The optical zone or echelette geometry includes an inner and outer diameter and a shape or slope of the optical portion, a height or zone height, and a shape of the transition zone. The surface area or diameter of the optical zone or echelettes largely determines the diffractive power(s) of the lens and the height of the transition zone between optical zones or echelettes largely determines the light distribution between the different powers or diffractive orders. Together, these optical zones or echelettes form a diffractive profile.

A multifocal diffractive profile of the lens may be used to mitigate presbyopia by providing two or more optical powers; for example, one for near vision and one for distance vision. The lenses may also take the form of an intraocular lens placed within the capsular bag of the eye, replacing the original lens, or placed in front of the natural crystalline lens. The lenses may also be in the form of a contact lens, most commonly a bifocal contact lens, or in any other form mentioned herein.

Although multifocal ophthalmic lenses lead to improved quality of vision for many patients, additional improvements would be beneficial. For example, chromatic aberrations may be improperly compensated by multifocal ophthalmic lenses, resulting in diminished optical performance. Improvements in ophthalmic lenses may be desired.

BRIEF SUMMARY

Embodiments herein described include a method including shifting a distance focus of a diffractive profile having a plurality of repeat periods for an optic of an ophthalmic lens from a first diffractive order to a second diffractive order by N diffractive orders by modifying the diffractive profile with a linear function that has a slope in r-squared space that reaches one wavelength multiplied by N at the end of each of the repeat periods.

Embodiments herein described include ophthalmic lenses including an optic including a diffractive profile formed by shifting a distance focus of the diffractive profile having a plurality of repeat periods from a first diffractive order to a second diffractive order by N diffractive orders by modifying the diffractive profile with a linear function that has a slope in r-squared space that reaches one wavelength multiplied by N at the end of each of the repeat periods.

Embodiments herein described include ophthalmic lenses including an optic including a diffractive profile having a distance focus, a near focus, a first intermediate focus, and a second intermediate focus, wherein the distance focus corresponds to the $1^{st}$ diffractive order or the $2^{nd}$ diffractive order of the diffractive profile.

Embodiments herein described include a method including providing an optic of an ophthalmic lens including a diffractive profile having a distance focus, a near focus, a first intermediate focus, and a second intermediate focus, wherein the distance focus corresponds to the $1^{st}$ diffractive order or the $2^{nd}$ diffractive order of the diffractive profile.

Embodiments herein described include ophthalmic lenses including an optic including a diffractive profile having a distance focus, a near focus, and an intermediate focus, wherein the distance focus corresponds to the $1^{st}$ diffractive order of the diffractive profile.

Embodiments herein described include a method including providing an optic of an ophthalmic lens including a diffractive profile having a distance focus, a near focus, and an intermediate focus, wherein the distance focus corresponds to the $1^{st}$ diffractive order of the diffractive profile.

DETAILED DESCRIPTION

FIGS. 1A, 1, 2A, 2B, 3A and 3B illustrate multifocal IOL lens geometries, aspects of which are described in U.S. Patent Publication No. 2011-0149236 A1, which is hereby incorporated by reference in its entirety.

Figure 1A:
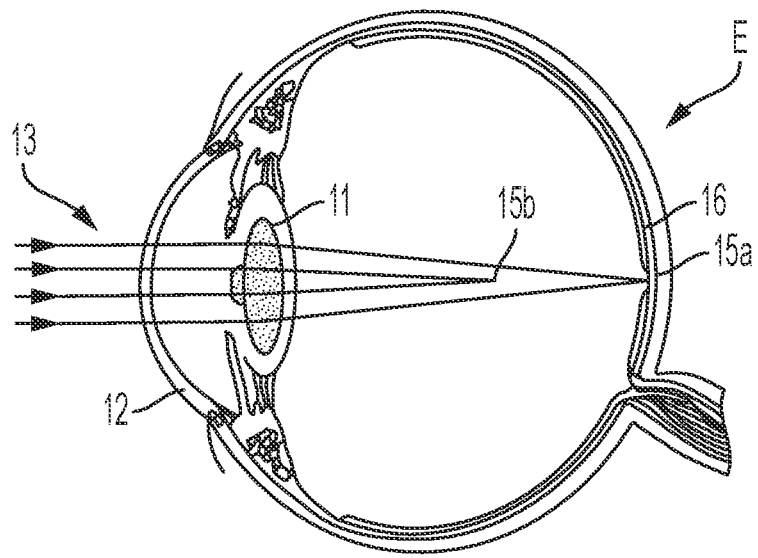
FIG. 1A illustrates a cross-sectional view of an eye with an implanted multifocal refractive intraocular lens.

FIG. 1A is a cross-sectional view of an eye E fit with a multifocal IOL 11. As shown, multifocal IOL 11 may, for example, comprise a bifocal IOL. Multifocal IOL 11 receives light from at least a portion of cornea 12 at the front of eye E and is generally centered about the optical axis of eye E. For ease of reference and clarity, FIGS. 1A and 1B do not disclose the refractive properties of other parts of the eye, such as the corneal surfaces. Only the refractive and/or diffractive properties of the multifocal IOL 11 are illustrated.

Each major face of lens 11, including the anterior (front) surface and posterior (back) surface, generally has a refractive profile, e.g. biconvex, plano-convex, plano-concave, meniscus, etc. The two surfaces together, in relation to the properties of the surrounding aqueous humor, cornea, and other optical components of the overall optical system, define the effects of the lens 11 on the imaging performance by eye E. Conventional, monofocal IOLs have a refractive power based on the refractive index of the material from which the lens is made, and also on the curvature or shape of the front and rear surfaces or faces of the lens. One or more support elements may be configured to secure the lens 11 to a patient's eye.

Multifocal lenses may optionally also make special use of the refractive properties of the lens. Such lenses generally include different powers in different regions of the lens so as to mitigate the effects of presbyopia. For example, as shown in FIG. 1A, a perimeter region of refractive multifocal lens 11 may have a power which is suitable for viewing at far viewing distances. The same refractive multifocal lens 11 may also include an inner region having a higher surface curvature and a generally higher overall power (sometimes referred to as a positive add power) suitable for viewing at near distances.

Figure 1B:
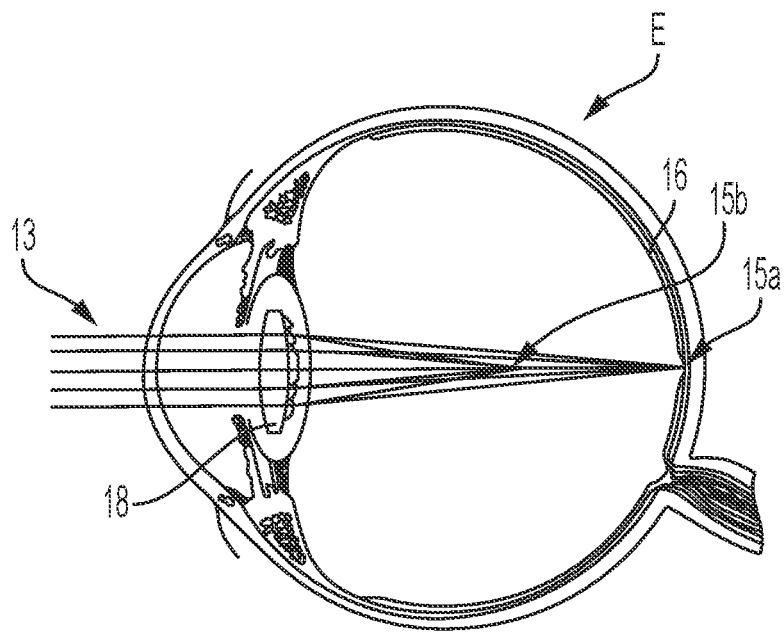
FIG. 1B illustrates a cross-sectional view of an eye having an implanted multifocal diffractive intraocular lens.

Rather than relying entirely on the refractive properties of the lens, multifocal diffractive IOLs or contact lenses can also have a diffractive power, as illustrated by the IOL 18 shown in FIG. 1B. The diffractive power can, for example, comprise positive or negative power, and that diffractive power may be a significant (or even the primary) contributor to the overall optical power of the lens. The diffractive power is conferred by a plurality of concentric diffractive zones which form a diffractive profile. The diffractive profile may be a geometric microstructure superimposed on a refractive base shape of a refractive optic of the lens. The diffractive profile may either be imposed on the anterior surface or posterior surface or both.

The diffractive profile of a diffractive multifocal lens directs incoming light into a number of diffractive orders. As light 13 enters from the front of the eye, the multifocal lens 18 directs light 13 to form a distance focus 15a on retina 16 for viewing distant objects and a near focus 15b for viewing objects close to the eye. Depending on the distance from the source of light 13, the focus on retina 16 may be the near focus 15b instead. Typically, distance focus 15a is associated with $0^{th}$ diffractive order and near focus 15b is associated with the $1^{st}$ diffractive order, although other orders may be used as well.

Bifocal ophthalmic lens 18 typically distributes the majority of light energy into two viewing orders, often with the goal of splitting imaging light energy about evenly (50%: 50%), one viewing order corresponding to distance vision and one viewing order corresponding to near vision, although typically, some fraction goes to non-viewing orders.

Trifocal or quadrifocal ophthalmic lenses may be provided, which may have one or more intermediate foci. A trifocal ophthalmic lens may include an intermediate focus, which may provide for vision at an intermediate distance. A quadrifocal ophthalmic lens may include a first intermediate focus and a second intermediate focus, which may each provide for vision at respective intermediate distances. For example, the first intermediate focus may be between the distance focus and the second intermediate focus. The second intermediate focus may be between the first intermediate focus and the near focus. Other forms of ophthalmic lenses may be utilized in embodiments (e.g., a greater number of foci, such as a pentafocal lens).

Corrective optics may be provided by phakic IOLs, which can be used to treat patients while leaving the natural lens in place. Phakic IOLs may be angle supported, iris supported, or sulcus supported. The phakic IOL can be placed over the natural crystalline lens or piggy-backed over another IOL. It is also envisioned that the present disclosure may be applied to inlays, onlays, accommodating IOLs, pseudophakic IOLs, other forms of intraocular implants, spectacles, and even laser vision correction.

Figure 2A:
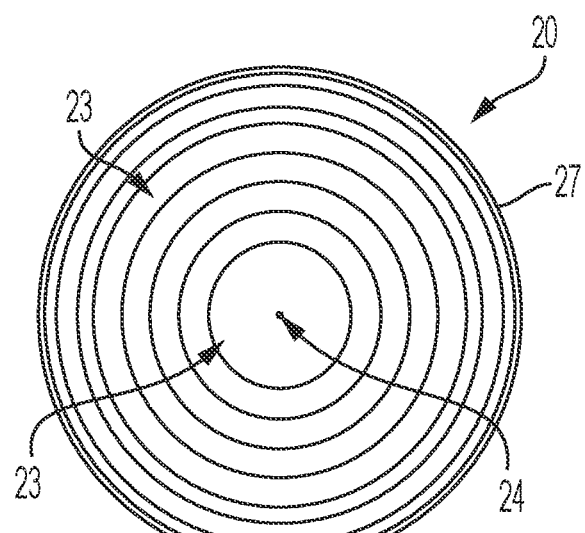
FIG. 2A illustrates a front view of a diffractive multifocal intraocular lens.
Figure 2B:
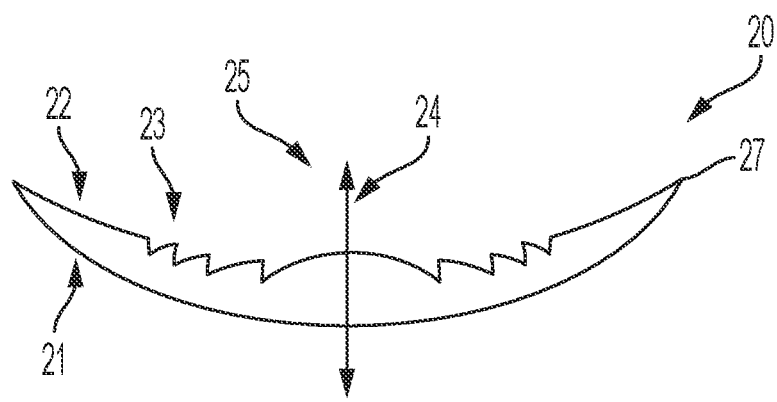
FIG. 2B illustrates a cross-sectional view of a diffractive multifocal intraocular lens.

FIGS. 2A and 2B show aspects of a conventional diffractive multifocal lens 20. Multifocal lens 20 may have certain optical properties that are generally similar to those of multifocal IOLs 11, 18 described above. Multifocal lens 20 has an anterior lens surface 21 and a posterior lens surface 22 disposed about an optical axis 24. The surfaces 21, 22, or lens faces, extend radially outward from the optical axis 24 to an outer periphery 27 of the optic. The optical axis 24 may extend through a central zone 25 of the optic. The surfaces 21, 22, or optical surfaces, face opposite each other.

When fitted onto the eye of a subject or patient, the optical axis of lens 20 is generally aligned with the optical axis of eye E. The curvature of lens 20 gives lens 20 an anterior refractive profile and a posterior refractive profile. Although a diffractive profile may also be imposed on either anterior surface 21 or posterior surface 22 or both, FIG. 2B shows posterior surface 22 with a diffractive profile. The diffractive profile is characterized by a plurality of annular optical zones or echelettes 23 spaced about optical axis 24. While analytical optics theory generally assumes an infinite number of optical zones or echelettes, a standard multifocal diffractive IOL typically has at least 7 optical zones or echelettes, and may have over 30 optical zones or echelettes. For the sake of clarity, FIG. 2B shows only four optical zones or echelettes. Typically, an IOL is biconvex, or possibly plano-convex, or convex-concave, although an IOL could be plano-plano, or other refractive surface combinations.

Figure 3A:
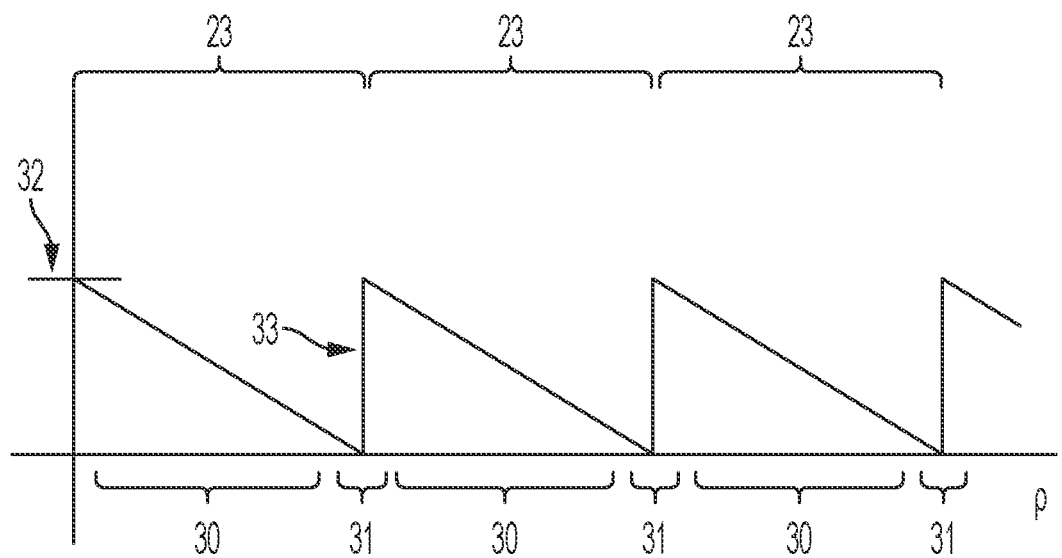
FIGS. 3A-3B are graphical representations of a portion of the diffractive profile of a conventional diffractive multifocal lens.
Figure 3B:
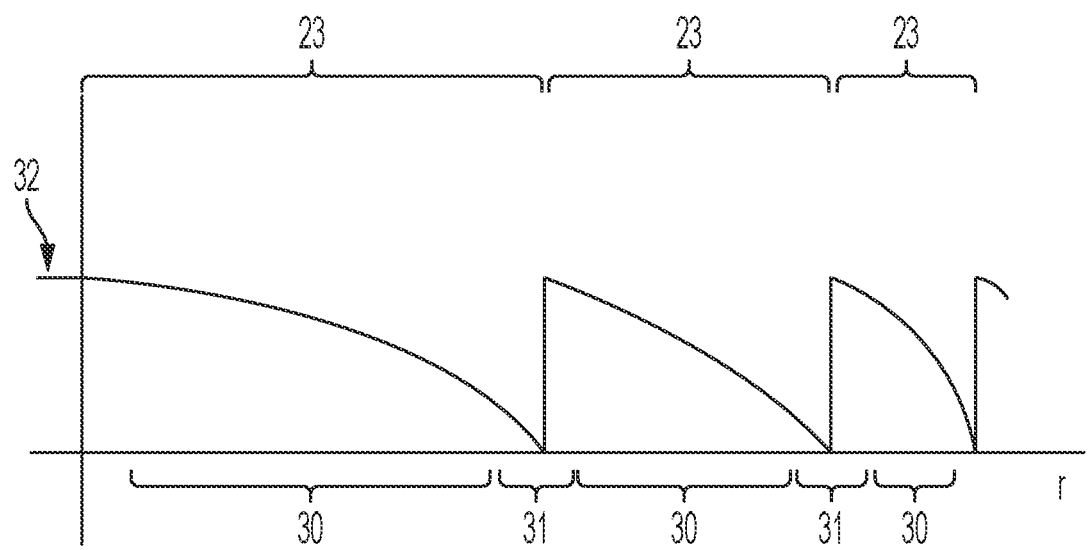

FIGS. 3A and 3B are graphical representations of a portion of a typical diffractive profile of a multifocal lens. While the graph shows only three optical zones or echelettes, typical diffractive lenses may extend from at least seven optical zones or echelettes to over thirty optical zones or echelettes. In FIG. 3A, the height 32 of the surface relief profile (from a plane perpendicular to the light rays) of each point on the optical zone surface is plotted against the square of the radial distance ($r^2$ or $\rho$) from the optical axis of the lens (referred to as r-squared space). In multifocal lenses, each optical zone or echelette 23 may have a diameter or distance from the optical axis which is often proportional to $\sqrt{n}$, n being the number of the optical zone or echelette 23 as counted from optical axis 24. Each optical zone or echelette has a characteristic optical portion 30 and transition zone 31. Optical portion 30 has a shape or downward slope that is typically parabolic as shown in FIG. 3B. The slope of each optical zone or echelette in r-squared space (shown in FIG. 3A), however, is constant over the optical portion, and for this example the same for all optical zones or echelettes shown. As for the typical diffractive lens, as shown here, all optical zones or echelettes have the same surface area. The area of the optical zones or echelettes 23 determines the diffractive powers of lens 20, and, as area and radii are correlated, the diffractive power is also related to the radii of the optical zones or echelettes. The height, or zone height, is the physical vertical offset of the leading edge to the trailing edge of each optical zone or echelette. An exemplary height of a transition zone 31 is marked as reference number 33 in FIG. 3A. The offset, or zone offset, is the height offset of the leading edge from the underlying base curve.

Diffractive profiles of ophthalmic lenses may have properties of chromatic correction that may reduce or fully compensate the positive chromatic aberration of the human cornea. Diffractive ophthalmic lenses may utilize the $0^{th}$ and $1^{st}$ diffractive order as the distance focus and near focus, respectively, of the ophthalmic lens. For the distance focus, the $0^{th}$ diffractive order energy goes to the distance image formed by the refractive carrier lens, whereas the $1^{st}$ diffractive order energy goes to the near image formed by the combination of the carrier lens plus the add power provided by the diffractive profile. In such a case, however, there may be a reduction or compensation (depending on the add power) of the chromatic aberration of the human cornea only at the near focus.

Embodiments herein may be directed, in part, to providing an ophthalmic lens in which a chromatic correction is provided at a distance focus of an ophthalmic lens. Embodiments herein may be directed, in part, to providing an ophthalmic lens in which a chromatic correction may be provided at a distance focus in addition to a near focus, and in embodiments, in addition to one or more intermediate foci. Embodiments herein may be directed, in part, to providing an ophthalmic lens in which a distance focus corresponds to a diffractive order that is not the $0^{th}$ diffractive order. Such a configuration may allow for chromatic correction at a distance focus, as well as other foci (e.g., one or more of a near focus or one or more intermediate foci). Embodiments herein may be directed, in part, to shifting a distance focus of a diffractive profile from a first diffractive order to a second diffractive order by modifying the diffractive profile. In embodiments, the distance focus may be shifted from corresponding to a $0^{th}$ diffractive order to a diffractive order that is not the $0^{th}$ diffractive order.

Figure 4A:
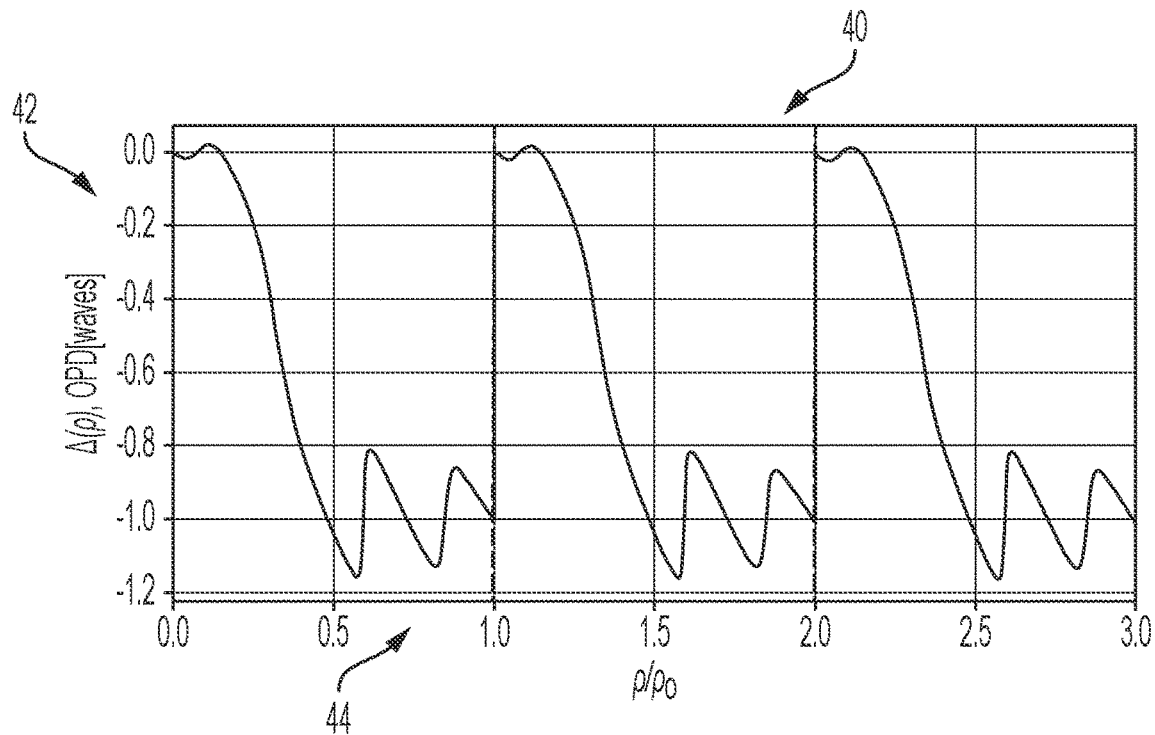
FIG. 4A illustrates a graph of a diffractive profile according to an embodiment of the present disclosure.

FIG. 4A, for example, illustrates a graph of a diffractive profile 40, with the optical path difference (OPD) show on the vertical axis 42 in units of wavelength. The diffractive profile 40 may repeat in r-squared space, with $\rho_0$ comprising the repeat period in r-squared space. As such, the horizontal axis 44 illustrates radial distance in r-squared space ($\rho$) as a proportion of the repeat period ($\rho_0$) in r-squared space.

The diffractive profile 40 has a plurality of the repeat periods ($\rho_0$). The diffractive profile 40 is shown to repeat in r-squared space for each of the repeat periods ($\rho_0$). According to embodiments herein, the diffractive profile 40 may comprise a variety of different forms of diffractive profiles, including a plurality of parabolic optical zones or parabolic echelettes, or a plurality of non-parabolic optical zones or non-parabolic echelettes, or transition zones having a periodic spacing or an aperiodic spacing. According to embodiments herein, the diffractive profile 40 may comprise an arbitrary diffractive profile that may repeat in r-squared space. Methods disclosed herein may be applied to an arbitrary diffractive profile that may repeat in r-squared space.

An arbitrary diffractive profile (as represented by diffractive profile 40) that repeats in r-squared spaced for each of the repeat periods may be defined by a function as follows:

$$\Delta(\rho) = f(\rho') \quad \text{(Eq. 1)}$$

$$\rho' = \rho - \text{floor}\left(\frac{\rho}{\rho_0}\right)\rho_0 \quad \text{(Eq. 2)}$$

Where $f(\rho)$ is an arbitrary function defined on the range $[0, \rho_0]$ that constitutes one repeat of the diffractive profile for the repeat period ($\rho_0$) (in r-squared space). Thus defined, the profile repeats the shape of $f$ every $\rho_0$. FIG. 4A, for example, illustrates three repeats.

Figure 4B:
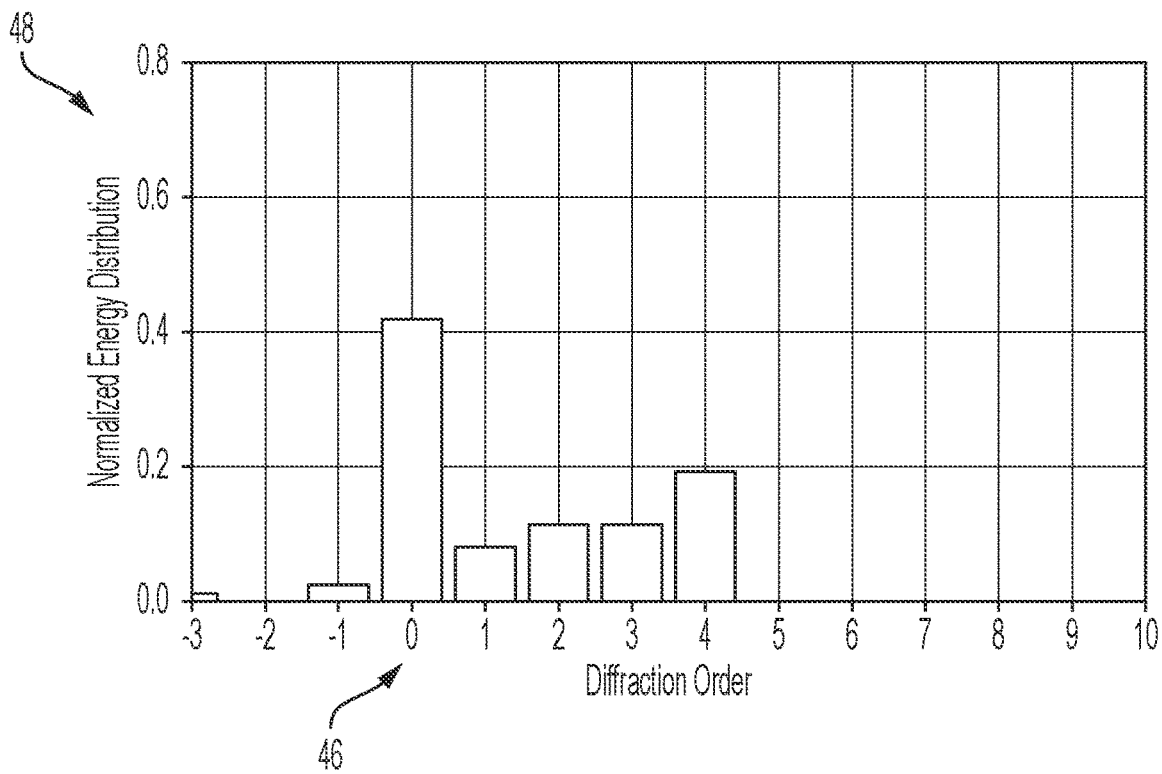
FIG. 4B illustrates a graph of an energy distribution of the diffractive profile shown in FIG. 4A.

FIG. 4B illustrates a graph of an energy distribution of the diffractive profile 40 shown in FIG. 4A. The diffractive order (e.g., $0^{th}$ diffractive order, $1^{st}$ diffractive order, $2^{nd}$ diffractive order, $3^{rd}$ diffractive order, $4^{th}$ diffractive order, etc.) is shown on the horizontal axis 46 and the normalized energy distribution of the diffractive profile 40 is shown on the vertical axis 48. As shown, the greatest distribution of light may be to the $0^{th}$ diffractive order, the second greatest distribution of light may be to the $4^{th}$ diffractive order, the third greatest distribution of light may be to the $2^{nd}$ and $3^{th}$ diffractive orders, and the fourth greatest distribution of light may be to the $1^{st}$ diffractive order. The diffractive orders shown in FIG. 4B may correspond to foci of the diffractive profile 40. The diffractive profile 40 may comprise a profile of a pentafocal optic in embodiments.

According to embodiments herein, the diffractive profile may be modified with a function to shift one or more of the foci from a first (or initial) diffractive order to a second (or subsequent) diffractive order. The one or more foci may be shifted for a variety of purposes. For example, as discussed herein, chromatic correction may be limited with a distance focus corresponding to a $0^{th}$ diffractive order. As such, it may be beneficial to shift the distance focus from the $0^{th}$ diffractive order to a $1^{st}$ diffractive order or a $2^{nd}$ diffractive order, or another diffractive order to improve chromatic correction.

According to embodiments herein, a shift from a first diffractive order to a second diffractive order may occur for a variety of foci, and may be a single order shift or a multiple order shift. Various forms of diffractive order shifting may be provided as desired, for various foci. The methods disclosed herein may be applied to an arbitrary function that may repeat in r-squared space. The arbitrary function may comprise a variety of different forms of diffractive profiles, including a plurality of parabolic optical zones or echelettes, or a plurality of non-parabolic optical zones or echelettes, or transition zones having a periodic spacing or an aperiodic spacing.

According to embodiments herein, the diffractive order shifting may occur by modifying a diffractive profile with a linear function in r-squared space. The linear function in r-squared space may comprise a profile that may be defined as $g(\rho)$ as follows:

$$g(\rho) = N_{shift} \cdot \frac{\rho}{\rho_0} \quad \text{(Eq. 3)}$$

Figure 5A:
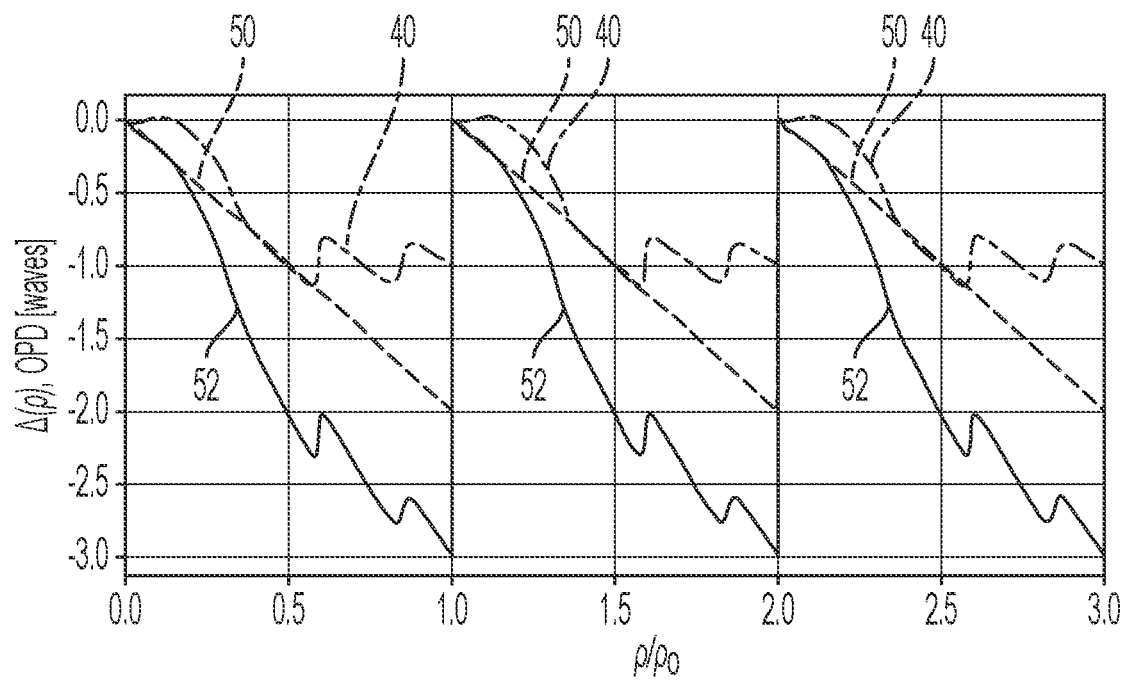
FIG. 5A illustrates a graph of a modified diffractive profile according to an embodiment of the present disclosure.

The value $N_{shift}$ comprises the number (N) of diffractive orders that the diffractive profile is to be shifted by. FIG. 5A, for example, illustrate a graph showing the diffractive profile 40 of FIG. 4A in a dashed line, with the linear function in r-squared space ($g(\rho)$) shown in a dot-dash line. The linear function $g(\rho)$ is shown to comprise a straight line 50 that has a slope in r-squared space that reaches one wavelength multiplied by the number N (the number of diffractive orders that the diffractive profile is to be shifted by) at the end of each of the repeat periods ($\rho_0$). The number (N) comprises two in the graph shown in FIG. 5A. The linear function $g(\rho)$ is shown to repeat for each of the repeat periods ($\rho_0$).

The diffractive profile 40 may be modified with the linear function $g(\rho)$ by adding the linear function $g(\rho)$ to the function $f(\rho)$ defining the diffractive profile 40 in r-squared space, with the new diffractive sag profile $\Delta_{shift}$ being defined as follows:

$$\Delta_{shift}(\rho) = f(\rho') + g(\rho') \quad \text{(Eq. 4)}$$

The diffractive profile will be shifted by number (N) of diffractive orders that the diffractive profile is to be shifted by. A resulting diffractive profile 52 is shown in a solid line in FIG. 5A.

Figure 5B:
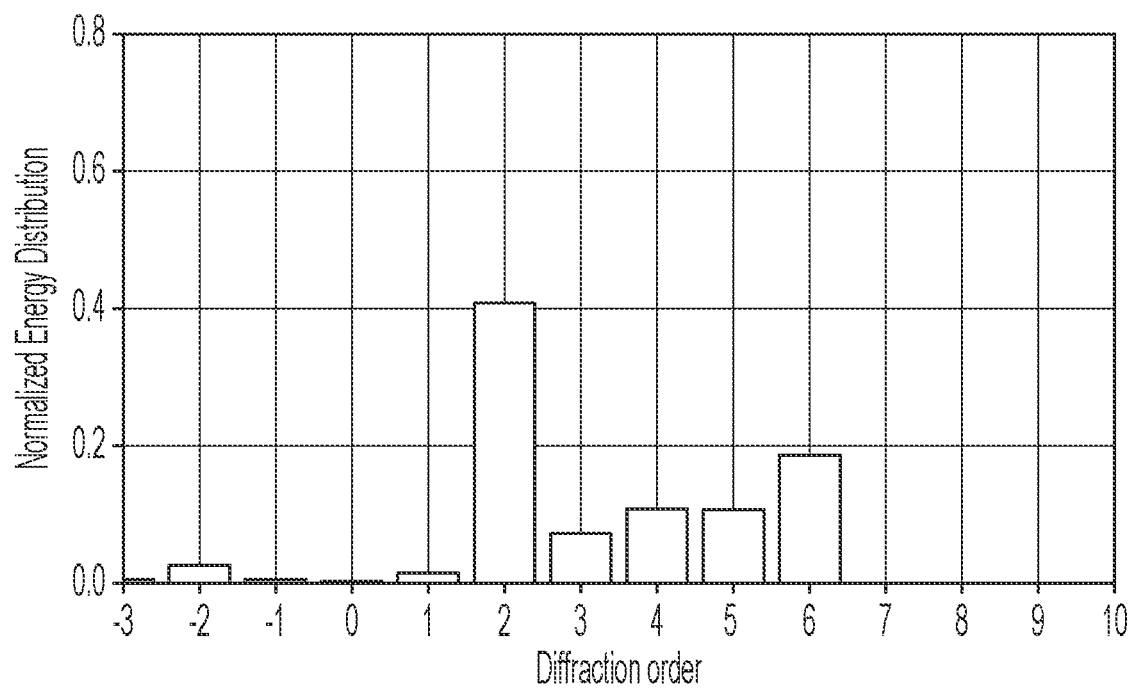
FIG. 5B illustrates a graph of an energy distribution of the diffractive profile shown in FIG. 5A.

FIG. 5B illustrates a graph of the energy distribution of the diffractive profile 52 shown in FIG. 5A. As shown, the energy distribution of the modified diffractive profile 52 is the same as the energy distribution shown for the diffractive profile 40 shown in FIG. 4B, yet shifted by two diffractive orders according to embodiments herein. The energy distribution of the $0^{th}$ diffractive order in FIG. 4B now corresponds to the $2^{nd}$ diffractive order in FIG. 5B, the energy distribution of the $1^{st}$ diffractive order now corresponds to the 3rd diffractive order, the energy distribution of the $2^{nd}$ diffractive order now corresponds to the $4^{th}$ diffractive order, the energy distribution of the $3^{rd}$ diffractive order now corresponds to the $5^{th}$ diffractive order, the energy distribution of the $4^{th}$ diffractive order now corresponds to the $6^{th}$ diffractive order, among the other shifts of diffractive orders. The number of shifts of diffractive orders may be defined by the value $N_{shift}$ utilized when modifying the diffractive profile 40.

According to embodiments herein, the shifts may occur for various foci of an ophthalmic lens, including shifting a distance focus of a diffractive profile for an optic of an ophthalmic lens from a first diffractive order to a second diffractive order by modifying the diffractive profile with a linear function in r-squared space. Shifting the distance focus may provide a variety of benefits, including but not limited to providing chromatic correction at a distance focus.

In embodiments, the amount of the shift may be by one diffractive order or may be by two diffractive orders (as represented in FIG. 5A for example). In embodiments, the amount of the shift may be by three or more diffractive orders, as desired.

FIGS. 6A-9B illustrate an exemplary process for shifting the foci of a quadrifocal lens from a first diffractive order to a second diffractive order by modifying the diffractive profile with a linear function in r-squared space. The quadrifocal lens may have the distance focus shifted to comprise the $1^{st}$ diffractive order or the $2^{nd}$ diffractive order.

Figure 6A:
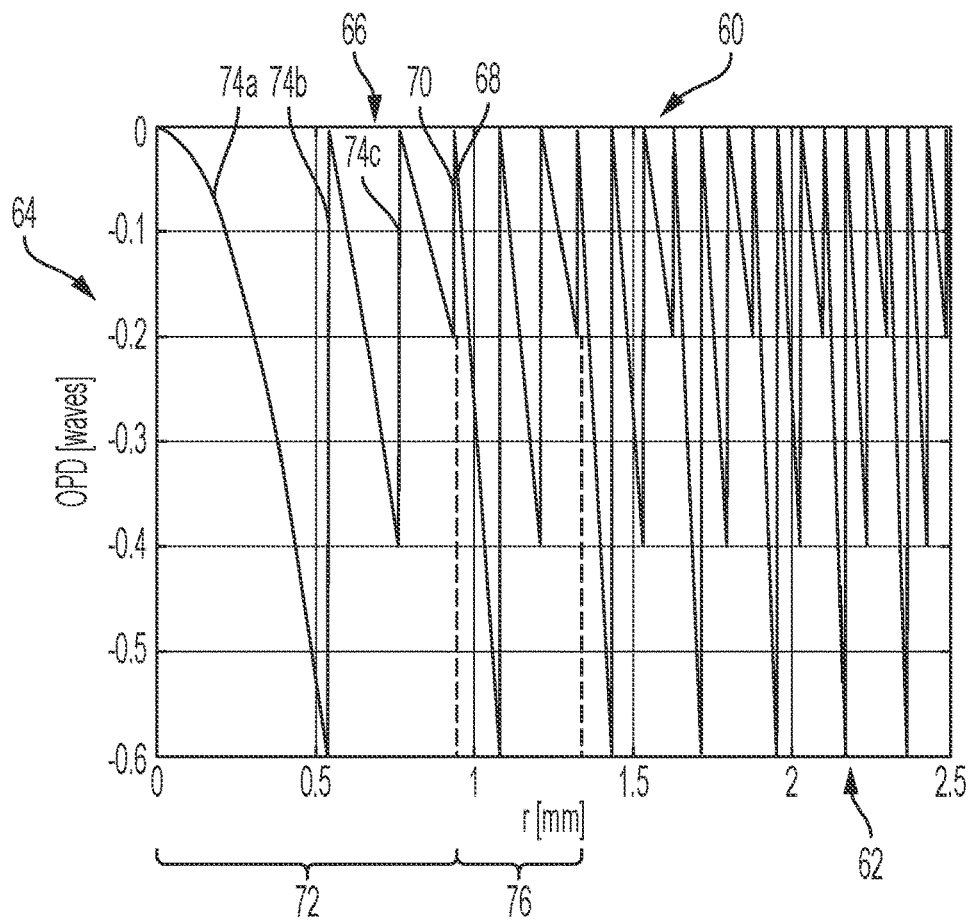
FIG. 6A illustrates a graph of a diffractive profile according to an embodiment of the present disclosure.

FIG. 6A, for example, illustrates an example diffractive profile 60 of an ophthalmic lens, with radius from an optical axis of the optic shown on the horizontal axis 62, and optical path difference (OPD) show on the vertical axis 64 in units of wavelength. The ophthalmic lens may include a distance focus, a near focus, a first intermediate focus, and a second intermediate focus. The optic may comprise a quadrifocal lens.

The ophthalmic lens may include a plurality of optical zones or echelettes 66. The optical zones or echelettes 66 may each include an optical portion, and a transition zone (with exemplary optical portion marked as reference number 68, and exemplary transition zone marked as reference number 70). The echelettes 66 may include a set of echelettes that repeats in r-squared space upon the optic. For example, the set 72 may include three echelettes 74*a, b, c*. This set 72 may be repeated in r-squared space radially outward from the set 72 (e.g., set 76 is marked in FIG. 6A and comprises a repetition of set 72). The repetitions may be adjacent to each other or may be spaced from each other in embodiments. The set 72 may be repeated once or may be repeated twice, or a greater amount as desired. The set 72 may repeat at least twice upon the optic in r-squared space in embodiments.

The echelettes 66 may comprise parabolic echelettes according to the methods of FIGS. 6A-9B.

Heights, or zone heights, (in units of wavelength) and the offsets, or zone offsets, (in units of wavelength) for the echelettes of the repeating set 72 may be provided in the table below:

TABLE 1

| Echelette (by reference number) | Height (in wavelengths) | Offset (in wavelengths) |
|---|---|---|
| 74a | 0.6000 | 0 |
| 74b | 0.4000 | 0 |
| 74c | 0.2000 | 0 |

Figure 6B:
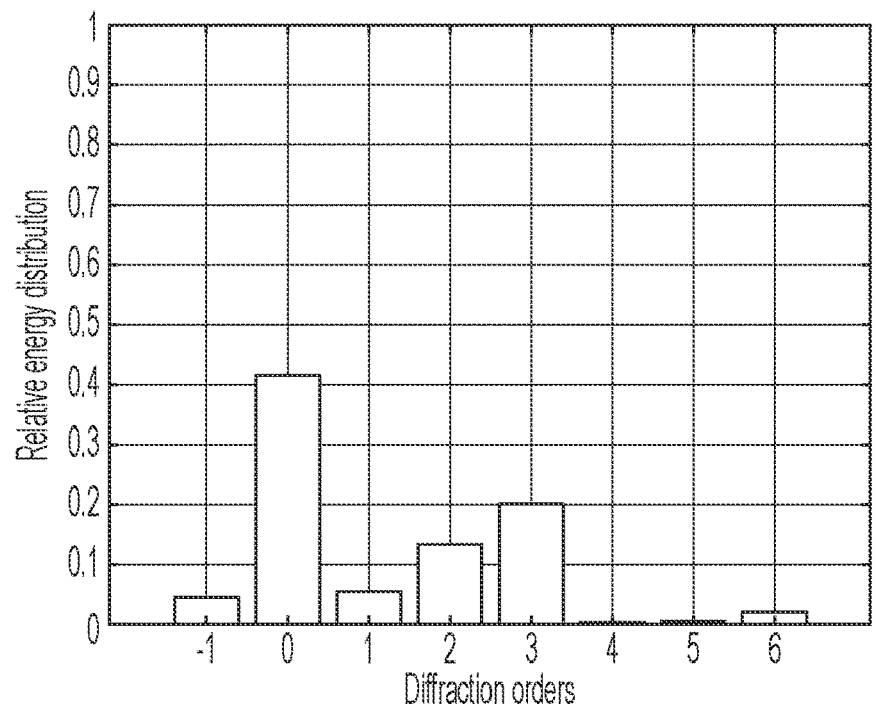
FIG. 6B illustrates a graph of an energy distribution of the diffractive profile shown in FIG. 6A.

FIG. 6B illustrates a graph of the energy distribution of the diffractive profile 60 shown in FIG. 6A. As shown, the greatest distribution of light may be to the $0^{th}$ diffractive order, the second greatest distribution of light may be to the $3^{rd}$ diffractive order, the third greatest distribution of light may be to the $2^{nd}$ diffractive order, and the fourth greatest distribution of light may be to the $1^{st}$ diffractive order. In embodiments, the $0^{th}$ diffractive order may correspond to the distance focus, the $3^{rd}$ diffractive order may correspond to the near focus, the $1^{st}$ diffractive order may correspond to a first intermediate focus, and the $2^{nd}$ diffractive order may correspond to a second intermediate focus.

As discussed herein, it may be beneficial to modify the diffractive profile such that the $0^{th}$ diffractive profile does not correspond to the distance focus. The benefits may include providing chromatic correction at a distance focus.

Figure 7:
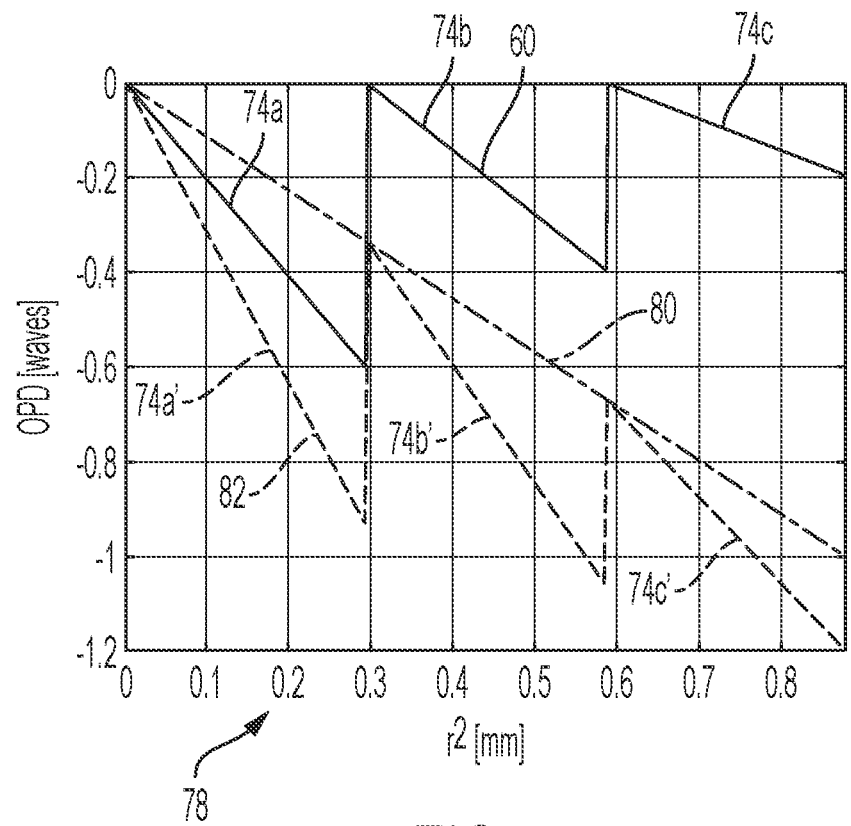
FIG. 7 illustrates a graph of a modified diffractive profile according to an embodiment of the present disclosure.

FIG. 7 illustrates the diffractive profile 60 in a solid line, with the horizontal axis 78 shown in units of r-squared. The dashed line 80 represents a function that is linear in r-squared space that the diffractive profile 60 may be modified with according to methods herein. The diffractive orders are to be shifted by $N_{shift}=1$ in FIG. 7. The resulting modified diffractive profile 82 is shown by the dot-dash line in FIG. 7.

Figure 8A:
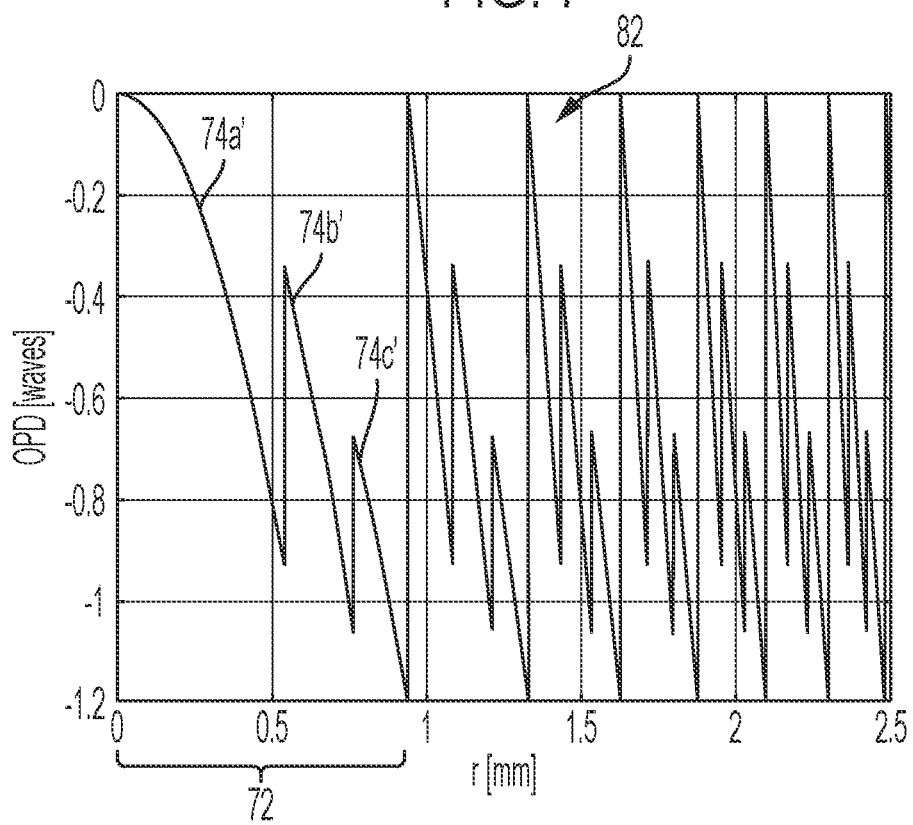
FIG. 8A illustrates a graph of a diffractive profile according to an embodiment of the present disclosure.

FIG. 8A illustrates the resulting diffractive profile 82. The modification of the echelettes of the diffractive profile may be provided by the following equations, with the prime (') referring to the resulting configuration, and the integer (i) referring to the number of the echelette within the set of echelettes (e.g., first echelette, second echelette, third echelette, in a set of three echelettes). The Period is the total number of echelettes within each set. The OrderShift corresponds to the value comprising the number (N) of diffractive orders that the diffractive profile is to be shifted by (equal to $N_{shift}$).

$$\text{Height}'(i) = \text{Height}(i) + \text{OrderShift}/\text{Period} \quad \text{(Eq. 5)}$$

$$\text{Offset}'(i) = \text{Offset}(i) - (i-1) * \text{OrderShift}/\text{Period} \quad \text{(Eq. 6)}$$

The resulting values for the modified echelettes may be as follows:

TABLE 2

| Echelette (by reference number) | Height' (in wavelengths) | Offset' (in wavelengths) |
|---|---|---|
| 74a' | 0.9333 | 0 |
| 74b' | 0.7333 | −1/3 |
| 74c' | 0.5333 | −2/3 |

The modified echelettes 74*a'*, 74*b'*, 74*c'* of the set 72 may repeat across the optic as shown in FIG. 8A. At least one of the echelettes may have a height that is less than one wavelength. As shown, each of the three echelettes 74*a'*, 74*b'*, 74*c'* may have a height that is less than one wavelength. Each of the three echelettes of the set may have a height that is different than a height of any other echelette of the set 72. Each of the three echelettes of the set have an offset that is different than an offset of any other echelette of the set.

Figure 8B:
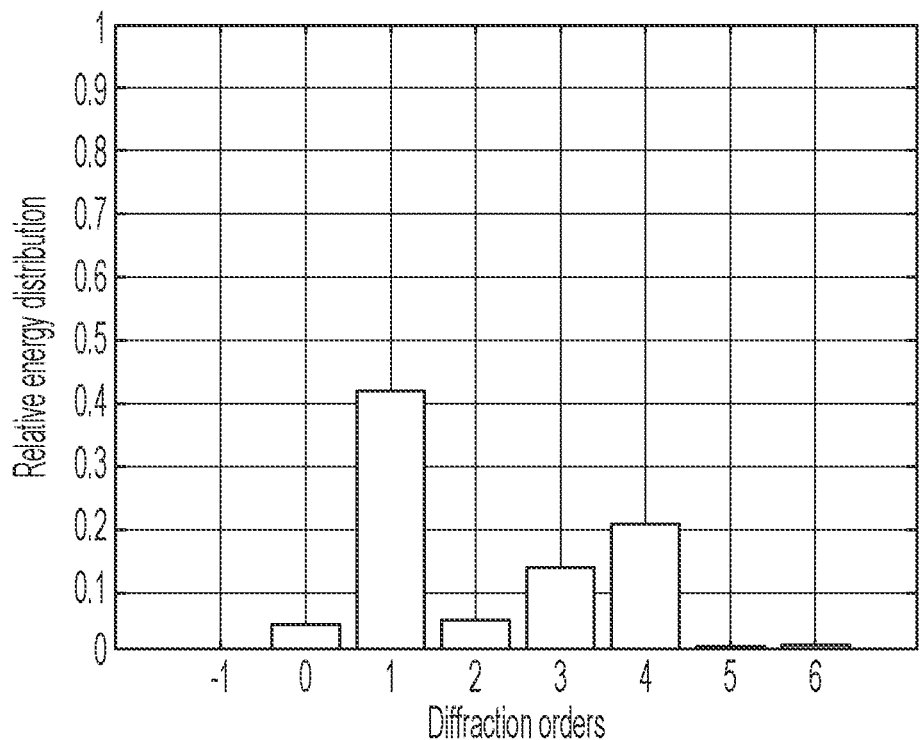
FIG. 8B illustrates a graph of an energy distribution of the diffractive profile shown in FIG. 8A.

FIG. 8B illustrates a graph of the energy distribution of the diffractive profile 82 shown in FIG. 8A. The energy distribution is shown to be the same as shown in FIG. 6B, yet shifted by one diffractive order. The distance focus now corresponds to the $1^{st}$ diffractive order. The near focus corresponds to the $4^{th}$ diffractive order. The first intermediate focus corresponds to the $2^{nd}$ diffractive order. The second intermediate focus corresponds to the $3^{rd}$ diffractive order. The distribution of light may be the same as shown in FIG. 6B, with the greatest distribution of light to the $1^{st}$ diffractive order (distance focus), the second greatest distribution of light to the $4^{th}$ diffractive order (near focus), the third greatest distribution of light to the $3^{rd}$ diffractive order (second intermediate focus), and the fourth greatest distribution of light to the $2^{nd}$ diffractive order (first intermediate focus).

Figure 9A:
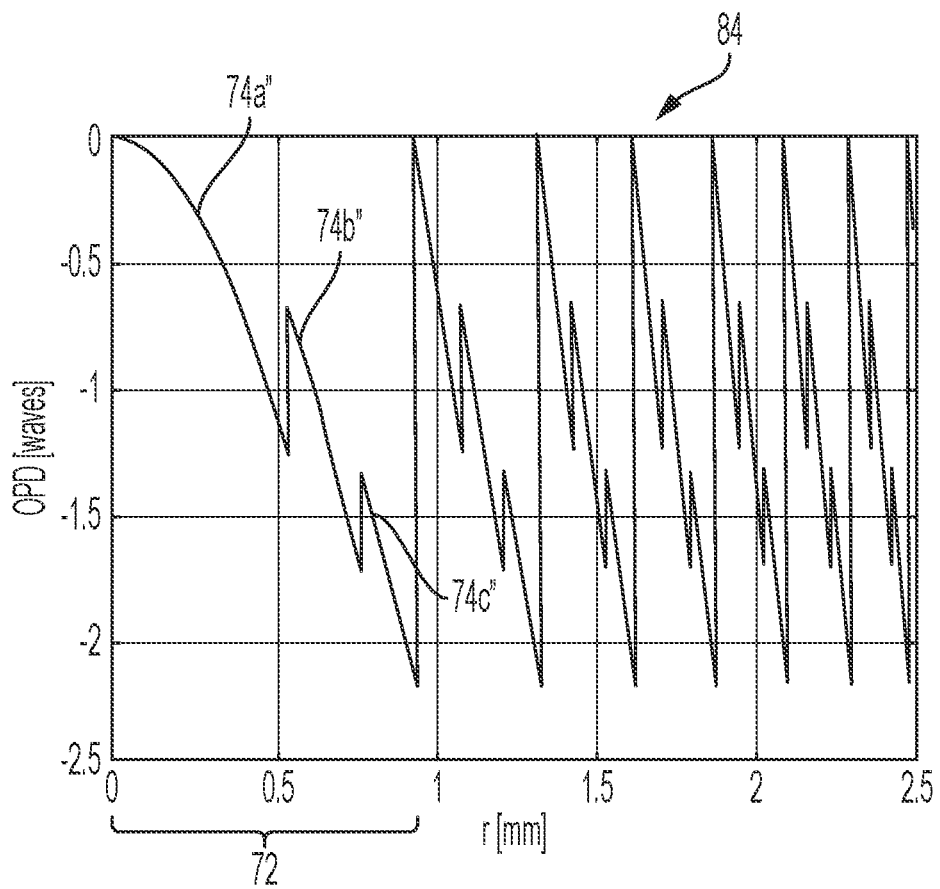
FIG. 9A illustrates a graph of a diffractive profile according to an embodiment of the present disclosure.

In embodiments, the diffractive profile may be shifted by two diffractive orders utilizing methods herein. FIG. 9A illustrates a resulting diffractive profile 84, including the modified echelettes 74*a"*, 74*b"*, 74*c"*. The resulting values for the modified echelettes may be as follows:

TABLE 3

| Echelette (by reference number) | Height" (in wavelengths) | Offset" (in wavelengths) |
|---|---|---|
| 74a" | 1.2667 | 0 |
| 74b" | 1.0667 | −2/3 |
| 74c" | 0.8667 | −4/3 |

The modified echelettes 74*a"*, 74*b"*, 74*c"* of the set 72 may repeat across the optic as shown in FIG. 9A. At least one of the echelettes may have a height that is less than one wavelength. At least one (two as shown in Table 3 above) may have a height that is greater than one wavelength. One of the three echelettes of the set has a height that is less than one wavelength and another of the three echelettes of the set has a height that is greater than one wavelength. In such an embodiment, each of the three echelettes of the set have an offset that is different than an offset of any other echelette of the set.

Figure 9B:
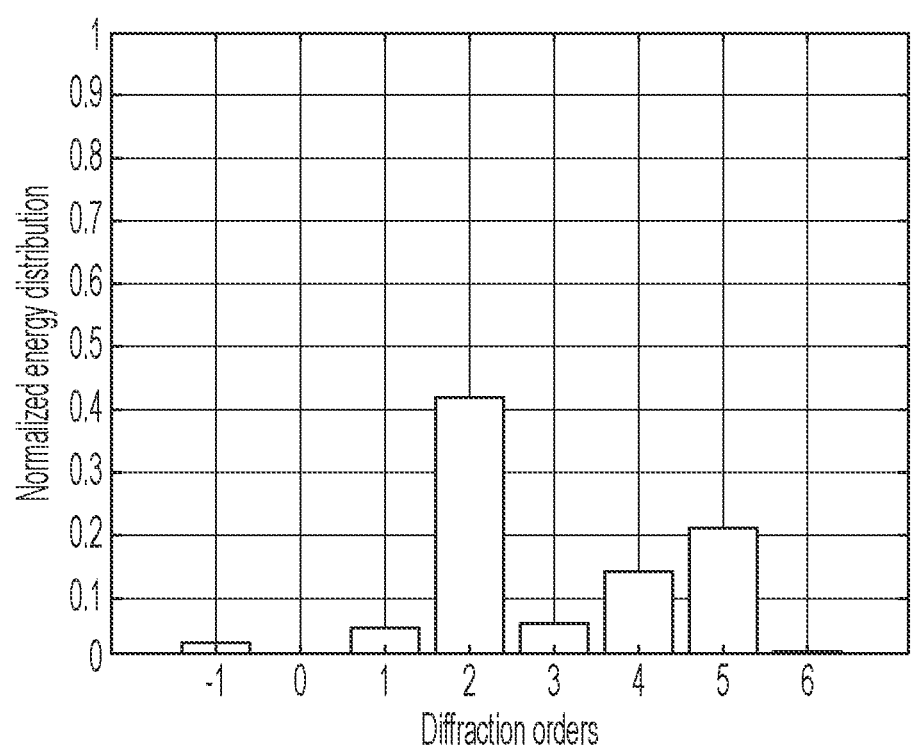
FIG. 9B illustrates a graph of an energy distribution of the diffractive profile shown in FIG. 9A.

FIG. 9B illustrates a graph of the energy distribution of the diffractive profile 84 shown in FIG. 9A. The energy distribution is shown to be the same as shown in FIGS. 6B and 8B, yet shifted by another diffractive order. The distance focus now corresponds to the $2^{nd}$ diffractive order. The near focus corresponds to the $5^{th}$ diffractive order. The first intermediate focus corresponds to the $3^{rd}$ diffractive order. The second intermediate focus corresponds to the $4^{th}$ diffractive order. The distribution of light may be the same as shown in FIGS. 6B and 8B, with the greatest distribution of light to the $2^{nd}$ diffractive order (distance focus), the second greatest distribution of light to the $5^{th}$ diffractive order (near focus), the third greatest distribution of light to the $4^{th}$ diffractive order (second intermediate focus), and the fourth greatest distribution of light to the $3^{rd}$ diffractive order (first intermediate focus).

Providing a distance focus at a $1^{st}$ diffractive order or a $2^{nd}$ diffractive order of the diffractive profile may have a variety of benefits, including chromatic correction at the distance focus. Further, chromatic correction may be provided at the near focus, and the first intermediate focus and the second intermediate focus. Shifting the distance focus to a $3^{rd}$ diffractive order may produce undesirable results, and in embodiments, the shift may be no more than to the $2^{nd}$ diffractive order (or two shifts of the diffractive orders). A shift of the distance focus to the $3^{rd}$ diffractive order (or a shift of three orders) may compensate a chromatic aberration of a cornea for a distance focus, but it may overcorrect it for the remaining orders—possibly leaving it uncorrected with an opposite sign for near vision. This may result in reduced contrast modulation for intermediate and near vision. As such, in embodiments, the shift may be limited to a shift of two orders for a quadrifocal lens, or a shift being no greater than to the $2^{nd}$ diffractive order for a distance focus. Providing a distance focus at a $1^{st}$ diffractive order or a $2^{nd}$ diffractive order may balance the effects of chromatic aberration throughout the different focusing distances. In embodiments, a greater shift may be provided as desired. For example, a shift may be at or greater than three orders for a quadrifocal, or may be at or greater than three orders for a pentafocal, among other results. In embodiments, any number of shifts may be provided for an optic having any number of foci according to methods herein.

FIGS. 6A-9B refer to a quadrifocal lens, yet the methods disclosed herein are not limited to a quadrifocal lens. In embodiments, a trifocal lens may be provided, having a distance focus, a near focus, and an intermediate focus. The same methods disclosed herein may be applied to provide a distance focus corresponding to a $1^{st}$ diffractive order of the diffractive profile. The distance focus may be shifted from corresponding to the $0^{th}$ diffractive order. The near focus may accordingly be shifted from the $2^{nd}$ order to correspond to the $3^{rd}$ diffractive order, and the intermediate focus may be shifted from the $1^{st}$ order to correspond to the $2^{nd}$ diffractive order. The trifocal lens may include a repeating set of two optical zones or echelettes in embodiments, which may repeat in a similar manner as repeating optical zones or echelettes of the quadrifocal lens.

The set of two optical zones or echelettes may repeat at least twice upon the optic in r-squared space. The set may repeat at least twice upon the optic in r-squared space. A first echelette of the set of the two echelettes may have a first height and a second echelette of the set of two echelettes may have a second height that is different than the first height. A first echelette of the set of two echelettes may have a first offset, and a second echelette of the set of two echelettes may have a second offset that is different than the first offset.

For a trifocal lens, shifting the distance focus to a $2^{nd}$ diffractive order may produce undesirable results, and in embodiments, the shift may be no more than to the $1^{st}$ diffractive order (or one shift of the diffractive orders). A shift of the distance focus to the $2^{nd}$ diffractive order (or a shift of two orders) may compensate a chromatic aberration of a cornea for a distance focus, but it may overcorrect it for the remaining orders—possibly leaving it uncorrected with an opposite sign for near vision. This may result in reduced contrast modulation for intermediate and near vision. As such, in embodiments, the shift may be limited to a shift of one order for a trifocal lens, or a shift being no greater than to the $1^{st}$ diffractive order for a distance focus. Providing a distance focus at a $1^{st}$ diffractive order may balance the effects of chromatic aberration throughout the different focusing distances. In embodiments, a greater shift may be provided as desired. For example, a shift of two orders, or three or more orders may be provided with a trifocal lens as desired.

The methods disclosed herein may be applied to other forms of optics and ophthalmic lenses as desired.

An optic for an ophthalmic lens that includes a profile disclosed herein may be fabricated utilizing a variety of methods. A method may include determining optical aberrations of a patient's eye. Measurements of a patient's eye may be made in a clinical setting, such as by an optometrist, ophthalmologist, or other medical or optical professional. The measurements may be made via manifest refraction, autorefraction, tomography, or a combination of these methods or other measurement methods. The optical aberrations of the patient's eye may be determined. Physical characteristics of the patient's eye may also be measured, such as pupil size and dilated and contracted sizes of the pupil may also be determined.

The measurements of the patient's eye may be placed in an ophthalmic lens prescription, which includes features of an optic that are intended to address the optical aberrations of the patient's eye, as well as features that address the pupillary size (including dilated and contracted sizes) of the patient.

The ophthalmic lens prescription may be utilized to fabricate an optic for the ophthalmic lens. A refractive profile of the optic, and a diffractive profile, among other properties may be determined based on the ophthalmic lens prescription.

The determination of a profile of the optic and the fabrication of the optic may be performed remotely from the optometrist, ophthalmologist, or other medical or optical professional that performed the measurements of a patient's eye, or may be performed in the same clinical facility of such an individual. If performed remotely, the fabricated optic may be delivered to an optometrist, ophthalmologist, or other medical or optical professional, for being provided to a patient. For an intraocular lens, the fabricated optic may be provided for implant into a patient's eye.

The fabricated optic may be a custom optic fabricated specifically for the patient's eye, or may be fabricated in a manufacturing assembly and then selected by an optometrist, ophthalmologist, or other medical or optical professional for supply to a patient, which may include implantation in the patient's eye.

Figure 10:
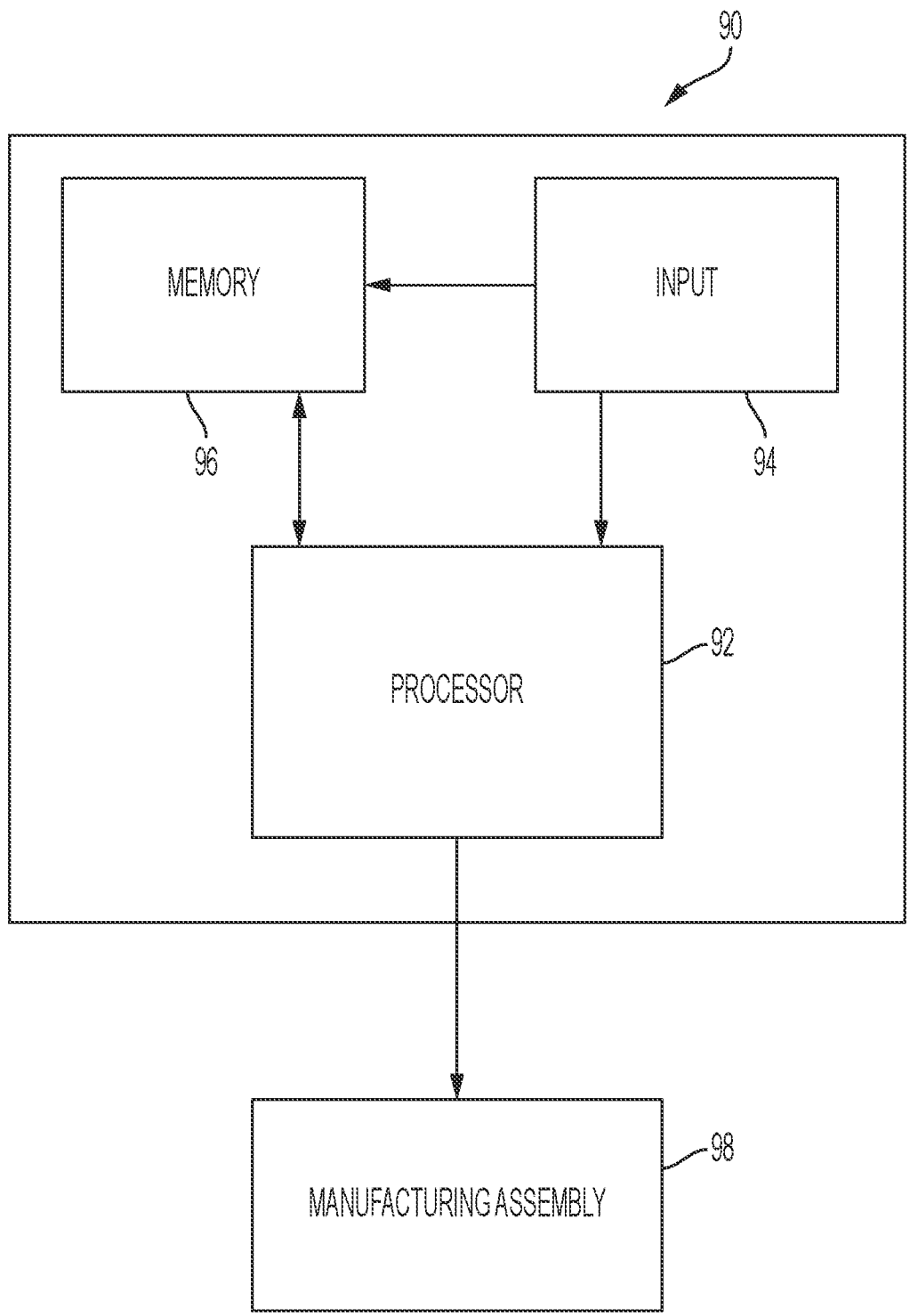
FIG. 10 illustrates an embodiment of a system.

FIG. 10 illustrates an embodiment of a system 90 that may be utilized to perform all or a portion of the methods disclosed herein. The system 90 may include a processor 92, an input 94, and a memory 96. In certain embodiments the system 90 may include a manufacturing assembly 98.

The processor 92 may comprise a central processing unit (CPU) or other form of processor. In certain embodiments the processor 92 may comprise one or more processors. The processor 92 may include one or more processors that are distributed in certain embodiments, for example, the processor 92 may be positioned remote from other components of the system 90 or may be utilized in a cloud computing environment. The memory 96 may comprise a memory that is readable by the processor 92. The memory 96 may store instructions, or features of intraocular lenses, or other parameters that may be utilized by the processor 92 to perform the methods disclosed herein. The memory 96 may comprise a hard disk, read-only memory (ROM), random access memory (RAM) or other form of non-transient medium for storing data. The input 94 may comprise a port, terminal, physical input device, or other form of input. The port or terminal may comprise a physical port or terminal or an electronic port or terminal. The port may comprise a wired or wireless communication device in certain embodiments. The physical input device may comprise a keyboard, touchscreen, keypad, pointer device, or other form of physical input device. The input 94 may be configured to provide an input to the processor 92.

The system 90 may be utilized to perform the methods disclosed herein, such as the processes of determining a profile of an optic.

The processor 92 may provide the profile of the optic to the manufacturing assembly 98, which may be configured to fabricate the optic for the ophthalmic lens based on the profile. The manufacturing assembly 98 may comprise one or more apparatuses for forming the optic and may comprise a high volume manufacturing assembly or a low volume manufacturing assembly. The manufacturing assembly 98 may be used for manufacture remote to a clinic in which measurements of the individual's eye or made, or local to such a clinic. The manufacturing assembly may include apparatuses such as lathe tools, or other lens formation devices to fabricate the optic.

In one embodiment, the processor 92 may be provided with an ophthalmic lens prescription for the individual's eye that may be provided as discussed herein. The processor 92 may receive the ophthalmic lens via the input 94. The system 90 may fabricate the optic for the ophthalmic lens based on the prescription.

The system 90 may be configured to fabricate any of the embodiments of ophthalmic lenses disclosed herein.

In embodiments, the methods disclosed herein may comprise methods performed with a processor 92. In embodiments, the method disclosed herein may be performed by a user. For example, methods of providing an optic of an ophthalmic lens may be performed by distributing, manufacturing, fabricating, designing, or otherwise providing such an optic of an ophthalmic lens. The optic may be configured according to embodiments herein and may be produced utilizing any of the methods disclosed herein.

Any of the embodiments of lens profiles discussed herein may be apodized to produce a desired result. The apodization may result in the heights and offsets of the echelettes being gradually varied according to the apodization, as to gradually increasing the amount of light in the distance focus as a function of pupil diameter.

The features of the optics disclosed herein may be utilized by themselves, or in combination with refractive profiles of the optics and/or with other features providing for correction of chromatic aberrations.

The ophthalmic lenses disclosed herein in the form of intraocular lenses are not limited to lenses for placement in the individual's capsular bag. For example, the intraocular lenses may comprise those positioned within the anterior chamber of the eye. In certain embodiments the intraocular lenses may comprise "piggy back" lenses or other forms of supplemental intraocular lenses.

Features of embodiments may be modified, substituted, excluded, or combined as desired.

In addition, the methods herein are not limited to the methods specifically described and may include methods of utilizing the systems and apparatuses disclosed herein.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. An ophthalmic lens comprising:
   an optic including a diffractive profile formed by shifting a distance focus of the diffractive profile having a plurality of repeat periods from a first diffractive order to a second diffractive order by N diffractive orders by modifying the diffractive profile with a linear function that has a slope in r-squared space that reaches one wavelength multiplied by N at the end of each of the repeat periods.

2. The ophthalmic lens of claim 1, wherein the diffractive profile is defined by a first function that repeats in r-squared space for each of the repeat periods, and the linear function has been added to the first function in r-squared space.

3. The ophthalmic lens of claim 2, wherein the linear function repeats for each of the repeat periods.

4. The ophthalmic lens of claim 3, wherein the diffractive profile includes a plurality of parabolic optical zones or a plurality of non-parabolic optical zones.

5. The ophthalmic lens of claim 4, wherein the diffractive profile includes a plurality of optical zones and a plurality of transition zones between the plurality of optical zones, wherein the plurality of transition zones includes a periodic spacing or an aperiodic spacing.

6. The ophthalmic lens of claim 1, wherein the distance focus is shifted from the first diffractive order to the second diffractive order by one diffractive order or two diffractive orders.

7. The ophthalmic lens of claim 6, wherein the first diffractive order is the $0^{th}$ diffractive order and the second diffractive order is the $1^{st}$ diffractive order or the $2^{nd}$ diffractive order.

8. The ophthalmic lens of claim 6, wherein the diffractive profile includes a plurality of optical zones, at least one of the plurality of optical zones having a height that is less than one wavelength.

9. The ophthalmic lens of claim 8, wherein the diffractive profile includes a set of at least two optical zones that repeats upon the optic in r-squared space.

10. The ophthalmic lens of claim 6, wherein at least one of the plurality of optical zones has a height that is greater than one wavelength.

11. The ophthalmic lens of claim 10, wherein the diffractive profile includes a set of at least two optical zones that repeats upon the optic in r-squared space.

* * * * *